United States Patent
Tanoura et al.

[11] 3,915,993
[45] Oct. 28, 1975

[54] D-GLUCAROLACTONE DERIVATIVES AND PROCESS FOR THE PREPARATION THEREOF

[75] Inventors: Arata Tanoura, Higashi-yamato; Hidenori Takahashi, Omiya; Norimitsu Sato, Wakabaya; Akitoshi Shioya, Saitama; Kiyoshi Okui, Tsuchiura, all of Japan

[73] Assignee: Chugai Seiyaku Kabushiki Kaisha, Tokyo, Japan

[22] Filed: Sept. 25, 1972

[21] Appl. No.: 291,528

[30] Foreign Application Priority Data
Sept. 25, 1971 Japan.................................. 46-74200

[52] U.S. Cl.............................. 260/340.7; 424/278
[51] Int. Cl.$^2$......................................... C07D 319/04
[58] Field of Search.......... 260/340.7, 558 R, 562 R

[56] References Cited
OTHER PUBLICATIONS

Ide, et al., "Yakugaku Zasshi," Vol. 86 (11), 1966 (Japan) pp. 1057–1063.
Ide, et al., "Yakugaku Zasshi," (Japan), Vol. 86 (11), 1966, pp. 31–36.

*Primary Examiner*—Donald G. Daus
*Assistant Examiner*—James H. Turnipseed
*Attorney, Agent, or Firm*—Browdy and Neimark

[57] ABSTRACT

The novel D-glucarolactone derivatives represented by the formula

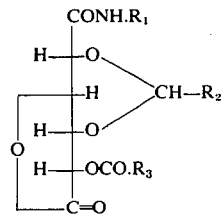

wherein $R_1$, $R_2$ and $R_3$ are as defined hereinafter, which are useful as anti-inflammatory agents and a process for the preparation thereof are disclosed.

40 Claims, No Drawings

D-GLUCAROLACTONE DERIVATIVES AND PROCESS FOR THE PREPARATION THEREOF

This invention relates to D-glucarolactone derivatives and a process for the preparation thereof. More particularly, this invention relates to D-glucarolactone derivatives represented by the formula

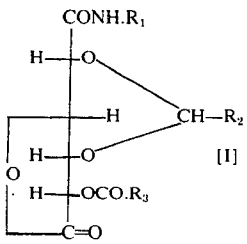

wherein $R_1$ is selected from the group consisting of a lower alkyl group, a lower alkoxyalkyl group, a cycloalkyl group, a lower alkenyl group, a phenyl group which may be substituted with a halogen atom or a lower alkoxy group, and a benzyl group which may be substituted with a halogen atom; $R_2$ represents a phenyl group which may be substituted with a halogen atom, a lower alkyl group or a lower alkoxy group; $R_3$ is selected from the group consisting of a lower alkyl, a carboxy-lower-alkyl group and a phenyl group which may be substituted with a halogen atom, and a process for the preparation of the D-glucarolactone derivatives as defined herein.

The D-glucarolactone derivatives [I] of the present invention are novel compounds and are useful as pharmaceuticals because of their excellent anti-inflammatory activity and low toxicity.

In accordance with the present invention, the compounds represented by the formula [I] can be prepared by reacting the compound represented by the formula

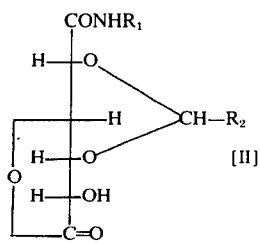

wherein $R_1$ and $R_2$ are as defined above, with a carboxylic acid or a functional derivative thereof represented by the formula

$$R_3 \text{ COOH} \quad [\text{III}]$$

wherein $R_3$ is as defined above.

The compound of the formula [II] used as a starting material can be prepared by reacting the compound of the formula

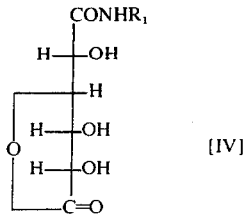

wherein $R_1$ is as defined above, with an aromatic aldehyde of the formula

$$R_2 - \text{CHO} \quad [\text{V}]$$

wherein $R_2$ is as defined above.

The compound [IV] used in the preparation of the starting material can be produced by the process disclosed in the Yakugaku Zasshi, Vol. 86, p 31 (1966). The compound [IV] can generally be obtained as a stable crystalline substance, but it is sometimes obtained as a soap-like material which shows poor crystallinity. In either case, the compound [II] can be used as a starting material for the process of this invention.

Suitable carboxylic acids of the formula [III] include, for example, acetic acid, propionic acid, butyric acid, benzoic acid and the like, and the functional derivative thereof includes an anhydride, a halide and an ester of the above carboxylic acids. Examples of the functional derivative of the carboxylic acid are acetic anhydride, isobutyric anhydride, benzoyl chloride, p-chlorobenzoyl chloride and the like.

In carrying out the process of this invention, the production of the desired compound [I] from the compound [II] can be effected by reacting the compound [II] with the compound [III] or a functional derivative thereof. This reaction proceeds merely by mixing the compound [II] and the compound [III] or a functional derivative thereof, but in order to conduct the reaction smoothly and to ensure the high yield of the desired product, it is preferable to carry out the reaction in the presence of an appropriate solvent such as benzene, acetone, chloroform, dimethylformamide, tetrahydrofuran and the like. Also, a condensing agent, for example, acids such as sulfuric acid, p-toluenesulfonic acid and the like, bases such as pyridine, quinoline, triethylamine, an alkali metal carbonate, an alkali metal alcoholate, or salts such as zinc chloride, sodium acetate, etc. can advantageously be used in the reaction. The reaction temperature is not critical, but an increased yield can usually be obtained at a reaction temperature ranging from 0° to 60°C.

The reaction between the compound [IV] and the aromatic aldehyde [V] for producing the compound [II] proceeds in the presence of an appropriate condensing agent. This reaction proceeds in the absence of reaction solvents, but is preferably carried out in an appropriate solvent such as an alcohol, dimethylformamide, tetrahydrofuran and the like. Suitable condensing agents include those commonly used for the acetal formation of saccharides, for example, zinc chloride, calcium chloride, cupric sulfate, phosphorus pentoxide, hydrochloric acid, sulfuric acid, p-toluenesulfonic acid and the like. The reaction temperature is not critical, but an increased yield is usually obtained at a reaction temperature ranging from 20° to 60°C. The thus obtained crude compound [II] can be used for the production of the compound [I] without further crystallization and/or purification.

Specific examples of the D-glucarolactone derivatives according to the present invention other than those specified in Examples hereinbelow are:
N-methyl-5-O-benzoyl-2,4-O-benzylidene-D-glucaro-1-amide-6,3-lactone, N-ethyl-2,4-O-benzylidene-5O-isobutyryl-D-glucaro-1-amide-6,3-lactone, N-ethyl-5O-benzoyl-2,4-O-benzylidene-D-glucaro-1-amide-6,3- lactone, N-isobutyl-5O-(p-chlorobenzoyl)-2,4-O-benzylidene-D-glucaro-1-amide-6,3-lactone, N-(n-hexyl)-2,4-O-benzylidene-5-O-succinoyl-D-glucaro-1-amide-6,3-lactone, N-(p-chlorobenzyl)-5O-(p-chlorobenzoyl)-2,4-O-benzylidene-D-glucaro-1-amide-6,3-lactone, N-phenyl-2,4-O-benzylidene-5 l-amide-6,3-lactone, N-phenyl-2,4-O-benzylidene-5-O-n-capryl-D-glucaro-1-amide-6,3-lactone, N-phenyl-5-O-benzoyl-2,4-O-benzylidene-D-glucaro-1-amide-6,3-lactone, N-(p-methoxyphenyl)-5-O-(p-chlorobenzoyl)-2,4-O-benzylidene-D-glucaro-1-amide-6,3-lactone, N-(o-chlorophenyl)-2,4-O-benzylidene-5-O-n-capryl-D-glucaro-1-amide-6,3-lactone, N-methyl-5-0-acetyl-2,4-O-(p-methoxybenzylidene)-D-glucaro-1-amide-6,3-lactone, N-(n-hexyl)-5-O-benzoyl-2,4-O-(p-methoxybenzylidene)-D-glucaro-1-amide-6,3-lactone, N-cyclohexyl-2,4-O-(p-methoxybenzylidene)-5-O-(n-butyryl)-D-glucaro-1-amide-6,3-lactone, N-cyclohexyl-5-O-benzoyl-2,4-O-(p-methoxybenzylidene)-D-glucaro-1-amide-6,3-lactone, N-(p-chlorobenzyl)-5-O-acetyl-2,4-O-(p-methoxybenzylidene)-D-glucaro-1-amide -6,3-lactone, N-allyl-5-O-acetyl-2,4-O-(p-methoxybenzylidene)-D-glucaro-1-amide-6,3-lactone, N-phenyl-5-O-acetyl-2,4-O-(p-methoxybenzylidene)-D-glucaro-1-amide-6,3-lactone, N-phenyl-2,4-O-(p-methoxybenzylidene)-5-O-n-capryl-D-glucaro-1-amide-6,3-lactone, N-phenyl-5-O-(p-chlorobenzoyl)-2,4-O-(p-methoxybenzylidene)-D-glucaro-1-amide-6,3-lactone, N-(p-chlorophenyl)-5-O-actyl-2,4-O-(p-Methoxybenzylidene)-D-glucaro-1-amide-6,3-lactone, N-cyclohexyl-5-O-acetyl-2,4-O-(o-chlorobenzylidene)-D-glucaro-1-amide-6,3-lactone, N-phenyl-5-O-acetyl-2,4-O-(o-chlorobenzylidene)-D-glucaro-1-amide-6,3-lactone, N-cyclohexyl-5-O-acetyl-2,4-O-(3,4-diethoxybenzylidene)-D-glucaro-1-amide-6,3-lactone, N-phenyl-5-O-acetyl-2,4-O-(3,4-diethoxybenzylidene)-D-glucaro-1-amide-6,3-lactone, N-phenyl-5-O-acetyl-2,4-O-(p-isopropylbenzylidene)-D-glucaro-1-amide-6,3-lactone, N-cyclohexyl-5-O-acetyl-2,4O-(p-methylbenzylidene)-D-glucaro-1-amide-6,3-lactone, N-phenyl-5-O-acetyl-2,4-O-(p-methylbenzylidene)-D-glucaro-1-amide-6,3-lactone.

The D-glucarolactone derivatives of the present invention are novel compounds and exhibit an excellent anti-inflammatory activity. They do not exhibit any appreciable toxicity and side-effects and are useful as anti-inflammatory agent which can be administered for a prolonged period of time in treating and alleviating the inflammatory conditions.

The present invention is further illustrated in greater detail by the following experiments and the examples, but they are not to be construed as limiting the scope of this invention.

EXPERIMENT 1

Activity on Acetic Acid-Induced Intraperitoneal Inflammation

Five week old ddY male mice (five mice per group) were orally administered the test compounds suspended in an aqueous gum arabic at a dosage level of 300 mg/kg of body weight. Thirty minutes after the administration, a 1.2% acetic acid aqueous solution was intraperitoneally injected to the mice at a level of 0.1 nl/10 g of body weight. The mice were sacrificed 3 hours after the acetic acid injection, and immediately subjected to the abdominal section and an intraperitoneal exudate was washed off with 5 ml of a physiological saline solution. The washings were then centrifuged and the serum protein content (concentration) in the supernatant was measured by the Biuret reaction to determine the intraperitoneal transsudate (extravascular) of the serum protein due to the inflammation. The results obtained are shown in Table 1 below.

Table 1

Activity on Acetic Acid - Induced Intraperitoneal Inflammation

| Test Compound | | | Suppression Rate |
|---|---|---|---|
| $R_1$ | $R_2$ | $R_3$ | (%) |
| —CH$_2$(CH$_2$)$_2$CH$_3$ |  | —CH$_3$ | 30.3 |
| —CH$_2$(CH$_2$)$_2$CH$_3$ |  | —CH$_2$CH$_2$CH$_3$ | 29.8 |
| —CH$_2$(CH$_2$)$_2$CH$_3$ |  |  | 25.5 |
| —CH$_2$(CH$_2$)$_4$CH$_3$ |  | —CH$_3$ | 27.3 |
|  |  | —CH$_3$ | 30.5 |
|  |  | —CH$_2$(CH$_2$)$_7$CH$_3$ | 46.8 |
|  | —OCH$_3$ | —CH$_3$ | 32.0 |
|  |  | —CH$_3$ | 33.9 |
| —OCH$_3$ |  | —CH$_3$ | 35.2 |
| —CH$_2$ |  | —CH$_3$ | 25.6 |
| —CH$_2$ | —OCH$_3$ | —CH$_3$ | 32.0 |
| —CH$_2$ |  | —CH$_2$CH$_3$ | 22.0 |
| —CH$_2$ |  | —CH(CH$_3$)$_2$ | 26.4 |

EXPERIMENT 2

Activity on Adjuvant Paw Edema

Male rats, Wister-Imamichi, weight 200 to 250 g (5 rats per group) were subcutaneously administered 0.1 ml per rat of a complete adjuvant (available from Intron Lab., Inc. Tokyo) into the planta of the right paw. When the edema reached its plateau, i.e., about 17 hours after the subcutaneous administration, the following experiment was conducted using the inflamed planta. That is, at the 17th hour after administration of the complete adjuvant, the plantar volume of each of the inflamed right paw and the normal left paw (control), and the test compound suspended in an aqueous gum arabic solution was then administered orally to the rats at a level of 300 mg per kg of body weight. Thereafter, the plantar volume of the rat paw was determined at intervals indicated in Table below in the same manner as above. The results obtained are shown in Table 2 below.

Table 2

Activity on Adjuvant Paw Edema

| Test Compound | | | Suppression Rate (%) | |
|---|---|---|---|---|
| $R_1$ | $R_2$ | $R_3$ | 2 Hours after administration | 4 Hours after administration |
| $-CH_2(CH_2)_2CH_3$ | phenyl | $-C_6H_4-Cl$ | 28.9 | 24.3 |
| $-CH_2(CH_2)_4CH_3$ | phenyl | $-C_6H_4-Cl$ | 20.1 | 11.3 |
| cyclohexyl-H | phenyl | $-CH_3$ | 20.1 | 12.4 |
| cyclohexyl-H | $-C_6H_4-OCH_3$ | $-CH_3$ | 30.0 | 22.3 |
| $-CH_2CH=CH_2$ | phenyl | $-CH_3$ | 30.6 | 16.5 |
| $-CH_2CH=CH_2$ | phenyl | $-CH(CH_3)_2$ | 20.4 | 14.8 |
| phenyl | phenyl | $-CH_2CH_3$ | 28.3 | 16.1 |
| $-CH_2$-phenyl | phenyl | $-CH(CH_3)_2$ | 14.0 | 12.7 |
| $-CH_2$-phenyl | phenyl | $-CH_2(CH_2)_7CH_3$ | 24.2 | 13.0 |
| $-CH_2$-phenyl | phenyl | $-CH_2CH_3$ | 18.2 | 10.0 |
| $-CH_2$-phenyl | phenyl | $-C_6H_4-Cl$ | 20.0 | 10.5 |

EXPERIMENT 3

Subacute Toxicity

The compounds prepared in Examples 5 and 7 were administered to male rats weighing 250 g, 6 rats per each group, at a dosage level of 500 mg/kg and 2,000 mg/kg over a period of one month to determine the subacute toxicity of the test compounds. The results obtained are shown in Tables 3 to 5 below.

1. Number of Deaths

Table 3

| Compound | | | Dose mg/kg | Ratio of Death |
|---|---|---|---|---|
| $R_1$ | $R_2$ | $R_3$ | | |
| cyclohexyl-H | $-C_6H_4-OCH_3$ | $-CH_3$ | 500 | 0/6 |
| | | | 2,000 | 0/6 |
| phenyl | phenyl | $-CH_3$ | 500 | 0/6 |
| | | | 2,000 | 0/6 |

2. Biochemical findings of blood

Table 4

Clinical chemistry value estimated on 29th day.

| Compound | | | Dose | AL-P King armstrong unit | GOT Karmen unit/ml | GPT Karmen unit/ml | TP % | BUN mg/dl | Cholesterol mg/dl |
|---|---|---|---|---|---|---|---|---|---|
| $R_1$ | $R_2$ | $R_3$ | | | | | | | |
| cyclohexyl-H | $-C_6H_4-OCH_3$ | $-CH_3$ | control | 44.1 | 74.6 | 27.7 | 6.0 | 19 | 49.1 |
| | | | 500 mg/kg | 39.7 | 69.4 | 21.4 | 5.8 | 17 | 47.5 |
| | | | 2000 mg/kg | 41.6 | 76.6 | 23.1 | 5.5 | 18 | 51.3 |
| phenyl | phenyl | $-CH_3$ | control | 41.6 | 65.8 | 22.8 | 6.0 | 23 | 51.8 |
| | | | 500 mg/kg | 30.3 | 70.7 | 20.0 | 6.4 | 24 | 55.7 |
| | | | 2000 mg/kg | 47.9 | 65.4 | 25.0 | 5.7 | 22 | 44.5 |

AL-P: activities of serum alkaline phosphatase
GOT : activities of glutamic-oxalacetic transaminase
GPT : activities of glutamic-pyruvic transaminase
TP : estimation of total protein
BUN : analysis of blood urea nitrogen 3. Hematological findings Table 5

| CPI | Dose (mg/kg) | Hematological values on the 24th day after administration | | | | | | | | | |
|---|---|---|---|---|---|---|---|---|---|---|---|
| | | RBC (10/mm) | Hb (g/dl) | Ht (%) | WBC (10/mm) | Baso. | Differential leucocyte counts | | | | |
| | | | | | | | Eosino. | Neutro. Stab. | Neutro. Seg. | Lymph. | Mono. |
| 340 | Control | 5.05 0.37 | 116.1 0.4 | 42.1 2.0 | 10.6 2.1 | | 0.3 | 5.8 | 6.8 | 86.9 | 0.2 |
| | 500 | 5.22 0.44 | 16.7 1.0 | 41.8 1.8 | 8.1 0.6 | | 0.4 | 6.4 | 7.1 | 85.9 | 0.2 |
| | 2000 | 5.33 0.10 | 16.6 0.5 | 40.8 0.7 | 6.9 1.1 | | 0.3 | 4.2 | 4.9 | 90.6 | 0.1 |
| 342 | Control | 5.12 0.48 | 16.9 1.9 | 44.4 4.3 | 7.9 1.2 | | 0.6 | 4.2 | 5.8 | 88.8 | 0.1 |
| | 500 | 5.36 0.35 | 16.4 0.6 | 46.2 1.6 | 6.4 1.6 | | 0.3 | 4.9 | 4.9 | 89.6 | 0.3 |
| | 2000 | 5.45 0.17 | 116.1 0.6 | 41.1 2.3 | 6.8 0.5 | | 0.3 | 4.5 | 3.9 | 91.3 | 0 |

RBC.—Red Blood Cell. Hb.—Hemoglobin. WBC.—White Blood Cell. Baso.—Basophilic Leucocyte. Neutro.—Neutrophilic Leucocyte. Stab.—Stable Neucleus Leucocyte. Seg.—Segmental Nucleus Leucocyte. Lymph.—Lymphocyte. Mono.—Monocyte. Ht.—Hematocrit.

As is clear from the results shown in Tables 3 to 5, no death was observed in the maximum dose 2,000 mg/kg of the compounds prepared in Examples 5 and 7, and no abnormality was also observed in the biological findings and the hematological findings.

Also, in the experiment on the subacute toxicity, no appreciable changes due to the medication were noted in other findings such as body weight, findings in anatomized body, organ weight and the pathological tissue observations.

EXAMPLE 1

7.0 g of N-allyl-D-glucaro-1-amido-6,3-lactone was suspended in 20 ml of benzaldehyde, and 15.0 g of zinc chloride which had been melt-dehydrated and pulverized was added to the suspension followed by vigorous stirring at room temperature whereby the lactone gradually dissolved exothermically. The reaction solution was then stirred for about 20 hours at room temperature and poured into about 300 ml of water, and the mixture was thoroughly stirred to dissolve zinc chloride. The precipitated benzaldehyde layer was separated, and benzaldehyde was distilled off under reduced pressure. The resulting soap-like material was thoroughly washed with a saturated sodium bicarbonate aqueous solution, and about 10 ml of isopropanol was added thereto followed by being heated to dissolve the material. Upon allowing to stand overnight in a refrigerator to precipitate crystals in a soap-like state. The resulting crystals were filtered and recrystallized from a small amount of ethanol to give N-allyl-2,4-O-benzylidene-D-glucaro-1-amido-6,3-lactone as a colorless powder. Yield, 2.8 g; melting point, 180°–184°C.

Analysis: Calcd. for $C_{16}H_{17}O_6N$: C, 60.18; H, 5.37; N, 4.39 (%). Found: C, 59.80; H, 5.34; N, 4.19 (%).

2.8 g of N-allyl-2,4-O-benzylidene-D-glucaro-1-amido-6,3-lactone obtained in above was suspended in 10 ml of acetic anhydride, and 4 ml of pyridine was added dropwise to the suspension while stirring at room temperature. After stirring at room temperature for 2 hours, the mixture was allowed to stand overnight and, on the next morning, poured into 100 ml of ice-water. The precipitated crystals were filtered, washed thoroughly with water and dried in a desiccator under reduced pressure. Recrystallization from a small amount of ethanol yielded N-allyl-5-O-acetyl-2,4-O-benzylidene-D-glucaro-1-amido-6,3-lactone as colorless needle crystals. Yield, 2.3 g; melting point, 166°–168°C.

Analysis: Calcd. for $C_{18}H_{19}O_7N$: C, 59.83; H, 5.30; N, 3.88 (%). Found: C, 60.04; H, 5.41; N, 3.95 (%).

EXAMPLE 2

3.5 g of N-allyl-2,4-O-benzylidene-D-glucaro-1-amido-6,3-lactone obtained in Example 1 was suspended in 10 ml of isobutyric anhydride, and 6 ml of pyridine was added dropwise thereto while stirring at room temperature. After stirring for 2 hours at room temperature, the mixture was allowed to stand overnight and, on the next morning, poured into 200 ml of ice-water. The precipitated crystals were filtered, washed thoroughly with water, and dried in a desiccator under reduced pressure. Recrystallization from a small amount of ethanol yielded N-allyl-2,4-O-benzylidene-5-O-isobutyryl-D-glucaro-1-amido-6,3-lactone as colorless short needle crystals. Yield, 3.0 g; melting point, 149°–150°C.

Analysis: Calcd. for $C_{20}H_{23}O_7N$: C, 61.69; H, 5.95; N, 3.60 (%). Found: C, 61.46; H, 5.90; N, 3.87 (%).

EXAMPLE 3

7.0 g of N-n-butyl-D-glucaro-1-amido-6,3-lactone was dissolved in 24 ml of benzaldehyde, and 15.0 g of zinc chloride which had been melt-dehydrated was added thereto followed by stirring at room temperature for about 24 hours. After thoroughly stirring, the reaction mixture was poured into about 300 ml of water, and a syrup which was formed upon stirring wash washed repeatedly with petroleum ether to remove benzaldehyde and to crystallize. The resulting crystals were filtered, dried and recrystallized from ethanol to give N-n-butyl-2,4-O-benzylidene-D-glucaro-1-amido-6,3-lactone. Yield, 7.2 g; melting point, 208°–209°C.

Analysis: Calcd. for $C_{17}H_{21}O_6N$: C, 60.88; H, 6.31; N, 4.18 (%). Found: C, 60.84; H, 6.45; N, 4.37 (%).

3.5 g of N-n-butyl-2,4-O-benzylidene-D-glucaro-1-amido-6,3-lactone obtained in above was suspended in 30 ml of chloroform, and 3.5 g of benzoyl chloride was added to the suspension. 2.0 ml of triethylamine was then added dropwise to the mixture over about 30 minutes while stirring at room temperature. After stirring for an additional 2 hours, the mixture was allowed to stand overnight and washed successively with 5% sulfuric acid, water, a saturated aqueous sodium bicarbonate using a separatory funnel and finally washed thoroughly with water. The chloroform layer was separated, dried with anhydrous sodium sulfate and distilled under reduced pressure to remove chloroform. The residual syrup was then crystallized by addition of a small amount of ethanol and the crystals were filtered and recrystallized from ethanol to give N-n-butyl-5-O-benzoyl-2,4-O-benzylidene-D-glucaro-1-amido-6,3-lactone as colorless short needle crystals. Yield, 3.0 g; melting point, 155°–156°C.

Analysis: Calcd. for $C_{24}H_{25}O_7N$: C, 65.59; H, 5.73; N, 3.19 (%). Found: C, 65.56; H, 5.87; N, 3.35 (%).

EXAMPLE 4

4.3 g of N-n-butyl-2,4-O-benzylidene-D-glucaro-1-amido-6,3-lactone obtained in Example 3 was suspended in 50 ml of chloroform, and 2.8 g of p-chlorobenzoyl chloride was added thereto. 2 ml of pyridine was then added dropwise to the mixture while stirring at room temperature over about 30 minutes. After stirring at room temperature for 2 hours, the mixture was allowed to stand overnight and then worded up in the same manner as described in Example 3 to give crystals. Recrystallization of the resulting crystals from ethanol yielded N-n-butyl-5-O-(p-chlorobenzoyl)-2,4-O-benzylidene-D-glucaro-1-amido-6,3-lactone as colorless short needle crystals. Yield, 3.2 g; melting point, 183°– °C.

Analysis: Calcd. for $C_{24}H_{24}O_7NCl$: C, 60.83; H, 5.10; N, 2.95 (%). Found: C, 60.74; H, 5.17; N, 3.07 (%).

EXAMPLE 5

10.0 g of N-cyclohexyl-D-glucaro-1-amido-6,3-lactone was suspended in 25 ml of p-anisaldehyde and 15.0 g of zinc chloride which had been melt-dehydrated was added thereto followed by stirring at room temperature for about 30 hours. After completion of the stirring, the reaction mixture was poured into a large amount of water, and the stirring was continued whereby the solidification occurred slowly. The resulting solid was filtered and washed with a small amount of isopropanol to give crude crystals which were then dried. Recrystallization from methanol yielded N-cyclohexyl-2,4-O-(p-methoxybenzylidene)-D-glucaro-1-amido-6,3-lactone as colorless fine needle crystals. Yield, 6,4 g; melting point, 235°–236°C.

Analysis: Calcd. for $C_{20}H_{25}O_7N$: C, 61.37; H, 6.44; N, 3.58 (%). Found: C, 60.98; H, 6.47; N, 3.59 (%).

5.0 g of N-cyclohexyl-2,4-O-(p-methoxybenzylidene)-D-glucaro-1-amido-6,3-lactone obtained in above was suspended in 15 ml of acetic anhydride, and 7 ml of pyridine was added dropwise to the suspension while stirring at room temperature. After stirring for an additional 2 hours, the mixture was allowed to stand overnight at room temperature and, on the next morning, poured into 200 ml of ice-water. The precipitated crystals were filtered, dried and recrystallized from ethanol to give N-cyclohexyl-5-O-acetyl-2,4-O-(p-methoxybenzylidene)-D-glucaro-1-amido-6,3-lactone as colorless thin needle crystals. Yield, 4.2 g; melting point, 204°–206°C.

Analysis: Calcd. for $C_{22}H_{27}O_8N$: C, 60.96; H, 6.28; N, 3.23 (%). Found: C, 61.25; H, 6.10; N, 3.41 (%).

EXAMPLE 6

12.0 g of N-(o-chlorobenzyl)-D-glucaro-1-amido-6,3-lactone was suspended in 50 ml of benzaldehyde, and 25.0 g of zinc chloride was added to the suspension followed by stirring at room temperature for about 24 hours. Working up the resulting mixture in the same manner as described in Example 3 yielded a crude crystal of N-(o-chlorobenzyl)-2,4-O-benzylidene-D-glucaro-1-amido-6,3-lactone as a soaplike substance (Yield, 12.5 g). The thus obtained crude crystals were washed with a small amount of isopropanol and dried in a desiccator under reduced pressure to give a pale brown powder. 4.5 g of the powder was then acetylated using 15 ml of acetic anhydride and 7 ml of pyridine at room temperature, and the acetylation mixture was allowed to stand overnight and poured into 200 ml of ice-water to give crude crystals. Recrystallization from methanol yielded N-(o-chlorobenzyl)-5-O-acetyl-2,4-O-benzylidene-D-glucaro-1-amido-6,3-lactone as colorless long needle crystals. Yield, 3.7 g; melting point, 241°C.

Analysis: Calcd. for $C_{22}H_{20}O_7NCl$: C, 59.27; H, 4.52; N, 3.14 (%). Found: C, 59.60; H, 4.53; N, 3.35 (%).

EXAMPLE 7

8.0 g of N-phenyl-D-glucaro-1-amido-6,3-lactone was suspended in 40 ml of benzaldehyde, and 15.0 g of zinc chloride which had been melt-dehydrated was added to the suspension. Working up the mixture in the same manner as described in Example 3 yielded crude crystals which were then recrystallized from methanol to give N-phenyl-2,4-O-benzylidene-D-glucaro-1-amido-6,3-lactone as colorless long needle crystals. Yield, 9.5 g; melting point, 242°–243°C. (decomposition).

Analysis: Calcd. for $C_{19}H_{17}O_6N$: C, 64.22; H, 4.82; N, 3.94 (%). Found: C, 64.24; H, 4.61; N, 3.93 (%).

4.2 g of N-phenyl-2,4-O-benzylidene-D-glucaro-1-amido-6,3-lactone obtained in above was acetylated at room temperature using 15 ml of acetic anhydride and 7 ml of pyridine, and the acetylation mixture was allowed to stand overnight. The mixture was then poured into 150 ml of icewater, and the precipitated crystals were recrystallized from methanol to give N-phenyl-5-O-acetyl-2,4-O-benzylidene-D-glucaro-1-amido-6,3-lactone as colorless plate crystals. Yield, 2.5 g; melting point, 191°–194°C.

Analysis: Calcd. for $C_{21}H_{19}O_7N$: C, 63.47; H, 4.82; N, 3.53 (%). Found: C, 63.58; H, 5.14; N, 3.59; (%).

EXAMPLES 8 – 21

In the same manner as described in Example 1, the compounds shown in Table 6 below were prepared.

Table 6

| Example No. | $R_1$ | Substituent $R_2$ | Melting Point (°C) | Empirical Formula | Elementary Analysis (%) (calculated value in bracket) | | |
|---|---|---|---|---|---|---|---|
| | | | | | C | H | N |
| 8 | —$CH_3$ | H | 238 – 239 | $C_{14}H_{15}O_6N$ | 57.33 (57.65 | 5.16 5.23 | 4.78 4.78) |
| 9 | —$CH_2CH_3$ | H | 224 – 225 | $C_{15}H_{17}O_6N$ | 58.63 (59.08 | 5.58 5.61 | 4.56 4.59) |

Table 6 -Continued

| Example No. | $R_1$ | Substituent $R_2$ | Melting Point (°C) | Empirical Formula | Elementary Analysis (%) (calculated value in bracket) C | H | N |
|---|---|---|---|---|---|---|---|
| 10 | —$CH_2CH_2CH_3$ | H | 190 – 192 | $C_{16}H_{19}O_6N$ | 59.80 (59.74 | 5.96 6.07 | 4.36 4.29) |
| 11 | —$CH_2(CH_2)_2CH_3$ | p—$OCH_3$ | 202 – 205 | $C_{18}H_{23}O_7N$ | 59.18 (59.20 | 6.33 6.24 | 3.83 3.99) |
| 12 | —$CH_2(CH_2)_2CH_3$ | o—Cl | 214 – 215 | $C_{17}H_{20}O_6N$ | 55.22 (55.14 | 5.45 5.63 | 3.79 3.81) |
| 13 | —$CH_2(CH_2)_2CH_3$ | 3,4-diethoxy | 221 – 222 | $C_{21}H_{29}O_8N$ | 59.56 (59.59 | 6.90 6.83 | 3.31 3.55) |
| 14 | —$CH_2CH(CH_3)_2$ | H | 222 – 224 | $C_{17}H_{21}O_6N$ | 60.88 (61.11 | 6.31 6.39 | 4.18 4.30) |
| 15 | —$CH_2(CH_2)_4CH_3$ | H | 198 – 199 | $C_{19}H_{25}O_6N$ | 62.79 (62.58 | 6.93 6.81 | 3.85 3.87) |
| 16 | cyclohexyl | H | 250 – 252 | $C_{19}H_{23}O_6N$ | 63.14 (62.88 | 6.42 6.44 | 3.88 3.79) |
| 17 | cyclohexyl | p—$CH(CH_3)_2$ | 237 – 239 | $C_{22}H_{29}O_6N$ | 65.49 (65.47 | 7.25 7.30 | 3.47 3.47) |
| 18 | —$CH_2$-phenyl | H | 180 – 183 (decomposition) | $C_{20}H_{19}O_6N \cdot 3/2H_2O$ | 60.66 (60.08 | 5.55 5.15 | 3.53 3.56) |
| 19 | —$CH_2$-phenyl-Cl | H | 181 – 182 (decomposition) | $C_{20}H_{18}O_6NCl$ | 59.49 (59.21 | 4.49 4.45 | 3.47 3.45) |
| 20 | phenyl-Cl | H | 234 – 235 | $C_{19}H_{16}O_6NCl$ | 58.55 (58.24 | 4.14 4.13 | 3.59 3.32) |
| 21 | —$CH_2.CH=CH_2$ | p—$CH_3$ | 218 – 220 | $C_{17}H_{19}O_6N$ | 61.25 (61.19 | 5.75 5.69 | 4.20 4.19) |

EXAMPLES 22 – 53

In the same manner as described in Example 1, the 30 compounds shown in Table 7 below were prepared.

Table 7

| Ex. No. | $R_1$ | $R_3$ | Substituent $R_2$ | Melting Point (°C) | Empirical Formula | Elementary Analysis (%) (calculated value in bracket) C | H | N |
|---|---|---|---|---|---|---|---|---|
| 22 | —$CH_3$ | —$CH_3$ | H | 207 – 209 | $C_{16}H_{17}O_7N$ | 57.31 (57.31 | 5.11 5.23 | 4.18 4.31) |
| 23 | —$CH_2$—$CH=CH_2$ | —$CH_2CH_2COOH$ | H | 157 – 158 | $C_{20}H_{21}O_9N$ | 57.28 (57.46 | 5.05 5.35 | 3.34 2.95) |
| 24 | —$CH_2(CH_2)_2CH_3$ | —$CH_3$ | H | 150 | $C_{19}H_{23}O_7N$ | 60.47 (60.56 | 6.14 6.30 | 3.71 3.85) |
| 25 | —$CH_2(CH_2)_2CH_3$ | —$CH_3$ | p—$OCH_3$ | 151 – 152 | $C_{20}H_{25}O_8N$ | 58.96 (58.74 | 6.18 5.98 | 3.44 3.32) |
| 26 | —$CH_2(CH_2)_2CH_3$ | —$CH_3$ | o—Cl | 174 – 175 | $C_{19}H_{22}O_7NCl$ | 55.41 (55.20 | 5.38 5.60 | 3.40 3.56) |
| 27 | —$CH_2(CH_2)_2CH_3$ | —$CH_3$ | 3,4-diethoxy | 211 – 214 | $C_{23}H_{32}O_9N$ | 59.34 (59.64 | 6.71 6.91 | 3.01 3.24) |
| 28 | —$CH_2(CH_2)_2CH_3$ | —$CH_2CH_3$ | H | 149 | $C_{20}H_{25}O_7N$ | 61.37 (61.57 | 6.44 6.64 | 3.58 3.81) |
| 29 | —$CH_2(CH_2)_2CH_3$ | —$CH_2CH_2CH_3$ | H | 132 – 134 | $C_{21}H_{27}O_7N$ | 62.21 (62.18 | 6.71 6.54 | 3.46 3.65) |
| 30 | —$CH_2CH(CH_3)_2$ | —$CH_3$ | H | 161 | $C_{19}H_{23}O_7N$ | 60.47 (60.85 | 6.14 6.23 | 3.71 3.91) |
| 31 | —$CH_2CH_2CH_2OCH_3$ | —$CH_3$ | H | 155 – 156 | $C_{19}H_{23}O_8N$ | 58.01 (58.00 | 5.89 5.92 | 3.56 3.64) |
| 32 | —$CH_2(CH_2)_4CH_3$ | —$CH_3$ | H | 145 – 146 | $C_{21}H_{27}O_7N$ | 62.21 (62.36 | 6.71 6.78 | 3.46 3.51) |
| 33 | —$CH_2(CH_2)_4CH_3$ | phenyl | H | 137 – 139 | $C_{26}H_{29}O_7N$ | 66.79 (66.74 | 6.25 6.34 | 3.00 2.97) |
| 34 | —$CH_2(CH_2)_4CH_3$ | phenyl-Cl | H | 152 – 154 | $C_{26}H_{28}O_7NCl$ | 62.21 (62.38 | 5.62 5.58 | 2.79 2.79) |
| 35 | cyclohexyl | —$CH_3$ | H | 193 – 195 | $C_{21}H_{25}O_7N$ | 62.52 (62.25 | 6.25 6.42 | 3.47 3.67) |
| 36 | cyclohexyl | —$CH_3$ | p—$CH(CH_3)_2$ | 140 – 142 | $C_{24}H_{31}O_7N$ | 64.70 (64.69 | 7.01 7.33 | 3.14 3.28) |
| 37 | cyclohexyl | —$CH_2(CH_2)_7CH_3$ | H | 149 | $C_{23}H_{41}O_7N$ | 67.55 (67.59 | 8.02 7.77 | 2.72 2.70) |
| 38 | cyclohexyl | —$CH_2CH_2COOH$ | H | 177 – 179 | $C_{23}H_{27}O_9N$ | 59.86 (59.98 | 5.90 5.95 | 3.04 3.07) |
| 39 | cyclohexyl | —$CH_2CH_2COOH$ | p—$OCH_3$ | 197 – 199 | $C_{24}H_{29}O_{10}N \cdot H_2O$ | 56.58 (56.74 | 6.13 5.89 | 2.75 2.78) |

Table 7 —Continued

| Ex. No. | R₁ | R₃ | Substituent R₂ | Melting Point (°C) | Empirical Formula | C | H | N |
|---|---|---|---|---|---|---|---|---|
| 40 | -⟨H⟩ | -⟨⟩ | H | 207 – 209 | $C_{26}H_{27}O_7N$ | 67.08 (66.96 | 5.85 5.84 | 3.01 2.81) |
| 41 | -⟨H⟩ | -⟨⟩-Cl | H | 226 (decomposition) | $C_{26}H_{26}O_7NCl$ | 62.46 (62.14 | 5.24 5.15 | 2.80 2.38) |
| 42 | —CH₂-⟨⟩ | —CH₃ | H | 200 | $C_{22}H_{21}O_7N$ | 64.22 (64.27 | 5.15 5.30 | 3.40 3.54) |
| 43 | —CH₂-⟨⟩ | —CH₃ | p—OCH₃ | 185 – 186 | $C_{23}H_{23}O_8N$ | 62.58 (62.43 | 5.25 5.21 | 3.17 3.23) |
| 44 | —CH₂-⟨⟩ | —CH₂CH₃ | H | 165 | $C_{23}H_{23}O_7N$ | 64.93 (64.93 | 5.45 5.53 | 3.29 3.34) |
| 45 | —CH₂-⟨⟩ | —CH₂CH₂CH₃ | H | 181 – 182 | $C_{24}H_{25}O_7N$ | 65.59 (65.80 | 5.73 6.06 | 3.19 3.29) |
| 46 | —CH₂-⟨⟩ | —CH(CH₃)₂ | H | 143 – 145 | $C_{24}H_{25}O_7N$ | 65.59 (65.59 | 5.73 6.07 | 3.19 3.23) |
| 47 | —CH₂-⟨⟩ | —CH₂(CH₂)₇CH₃ | H | 141 – 142 | $C_{30}H_{37}O_7N$ | 68.81 (68.86 | 7.12 6.95 | 2.68 2.81) |
| 48 | —CH₂-⟨⟩ | -⟨⟩-Cl | H | 187 – 190 | $C_{27}H_{22}O_7NCl$ | 63.85 (63.90 | 4.37 4.41 | 2.76 2.77) |
| 49 | —CH₂-⟨⟩-Cl | —CH₃ | H | 228 – 230 | $C_{22}H_{20}O_7NCl$ | 59.27 (59.37 | 4.52 4.56 | 3.14 3.28) |
| 50 | -⟨⟩-OCH₃ | —CH₃ | H | 207 – 208 | $C_{22}H_{21}O_8N$ | 61.82 (61.62 | 4.95 5.14 | 3.28 3.29) |
| 51 | -⟨⟩-OC₂H₅ | —CH₃ | H | 209 – 212 | $C_{23}H_{23}O_8N$ | 62.58 (62.45 | 5.25 5.47 | 3.17 3.32) |
| 52 | -⟨⟩-Cl | —CH₃ | H | 230 – 231 | $C_{21}H_{18}O_7NCl$ | 58.41 (58.56 | 4.20 4.28 | 3.24 3.42) |
| 53 | -⟨⟩-Cl | -⟨⟩ | H | 217 – 219 | $C_{26}H_{20}O_7NCl$ | 63.23 (63.17 | 4.08 4.02 | 2.84 2.93) |

What is claimed is:

1. A D-glucarolactone compound of the formula

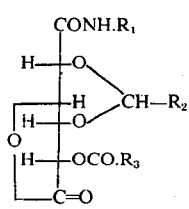

wherein R₁ is selected from the group consisting of alkyl having 1–6 carbon atoms, 3 methoxypropyl, cyclohexyl, allyl, phenyl, phenyl substituted with chloride, methoxy or ethoxy as a substituent, benzyl and benzyl substituted with chloride as a substituent; R₂ represents phenyl or phenyl substituted with a chloride alkyl having 1–3 carbon atoms, methoxy or ethoxy as a substituent; and R₃ represents alkyl having 1–9 carbon atoms, 2-carboxy ethyl, phenyl or phenyl substituted with chloride as a substituent.

2. N-Allyl-5-O-acetyl-2,4-O-benzylidene-D-glucaro-1-amide-6,3-lactone in accordance with claim 1.

3. N-Allyl-2,4-O-benzylidene-5-O-isobutyryl-D-glucaro-1-amide-6,3-lactone in accordance with claim 1.

4. N-n-Butyl-5-O-benzoyl-2,4-O-benzylidene-D-glucaro-1-amide-6,3-lactone in accordance with claim 1.

5. N-(n-Butyl)-5-O-(p-chlorobenzoyl)-2,4-O-benzylidene-D-glucaro-1-amide-6,3-lactone in accordance with claim 1.

6. N-Cyclohexyl-5-O-acetyl-2,4-O-(p-methoxybenzylidene)-D-glucaro-1-amide-6,3-lactone in accordance with claim 1.

7. N-(o-Chlorobenzyl)-5-O-acetyl-2,4-O-benzylidene-D-glucaro-1-amide-6,3-lactone in accordance with claim 1.

8. N-Phenyl-5-O-acetyl-2,4-O-benzylidene-D-glucaro-1-amide-6,3-lactone in accordance with claim 1.

9. N-Methyl-5-O-acetyl-2,4-O-benzylidene-D-glucaro-1-amide-6,3-lactone in accordance with claim 1.

10. N-Allyl-2,4-O-benzylidene-5-O-(β-carboxypropionyl)-D-glucaro-1-amide-6,3-lactone in accordance with claim 1.

11. N-(n-Butyl)-5-O-acetyl-2,4-O-benzylidene-D-glucaro-1-amide-6,3-lactone in accordance with claim 1.

12. N-(n-Butyl)-5-O-acetyl-2,4-O-(p-methoxybenzylidene)-D-glucaro-1-amide-6,3-lactone in accordance with claim 1.

13. N-(n-Butyl)-5-O-acetyl-2,4-O-(p-chlorobenzylidene)-D-glucaro-1-amide-6,3-lactone in accordance with claim 1.

14. N-(n-Butyl)-5-O-acetyl-2,4-O-(3,4-diethoxybenzylidene)-D-glucaro1-amide-6,3-lactone in accordance with claim 1.

15. N-(n-Butyl)-2,4-O-benzylidene-5-O-propionyl-D-glucaro-1-amide-6,3-lactone in accordance with claim 1.

16. N-(n-Butyl)-2,4-O-benzylidene-5-O-butyryl-D-glucaro-1-amide-6,3-lactone in accordance with claim 1.

17. N-(iso-Butyl)-5-O-acetyl-2,4-O-benzylidene-D-glucaro-1-amide-6,3-lactone in accordance with claim 1.

18. N-(γ-Methoxypropyl)-5-O-acetyl-2,4-O-benzylidene-D-glucaro-1-amide-6,3-lactone in accordance with claim 1.

19. N-(n-Hexyl)-5-O-acetyl-2,4-O-benzylidene-D-glucaro-1-amide-6,3-lactone in accordance with claim 1.

20. N-(n-Hexyl)-5-O-benzoyl-2,4-O-benzylidene-D-glucaro-1-amide-6,3-lactone in accordance with claim 1.

21. N-(n-Hexyl)-5-O-(p-chlorobenzoyl)-2,4-O-benzylidene-D-glucaro-1-amide-6,3-lactone in accordance with claim 1.

22. N-Cyclohexyl-5-O-acetyl-2,4-O-benzylidene-D-glucaro-1-amide-6,3-lactone in accordance with claim 1.

23. N-Cyclohexyl-5-O-acetyl-2,4-O-(p-iso-propylbenzyliden)-D-glucaro-1-amide-6,3-lactone in accordance with claim 1.

24. N-Cyclohexyl-2,4-O-benzylidene-5-O-n-capryl-D-glucaro-1-amide-6,3-lactone in accordance with claim 1.

25. N-Cyclohexyl-2,4-O-benzylidene-5-O-succinoyl-D-glucaro-1-amide-6,3-lactone in accordance with claim 1.

26. N-Cyclohexyl-2,4-O-(p-methoxybenzylidene)-5-O-succinoyl-D-glucaro-1-amide-6,3-lactone in accordance with claim 1.

27. N-Cyclohexyl-5-O-benzyl-2,4-O-benzylidene-D-glucaro-'-amide-6,3-lactone in accordance with claim 1.

28. N-Cyclohexyl-5-O-(p-chlorobenzoyl)-2,4-O-benzylidene-D-glucaro-1-amide-6,3-lactone in accordance with claim 1.

29. N-Benzyl-5-O-acetyl-2,4-O-benzylidene-D-glucaro-1-amide-6,3-lactone in accordance with claim 1.

30. N-Benzyl-5-O-acetyl-2,4-O-(p-methoxybenzylidene)-D-glucaro-1-amide-6,3-lactone in accordance with claim 1.

31. N-Benzyl-2,4-O-benzylidene-5-O-propionyl-D-glucaro-1-amide-6,3-lactone in accordance with claim 1.

32. N-Benzyl-2,4-O-benzylidene-5-O-butyryl-D-glucaro-1-amide-6,3-lactone in accordance with claim 1.

33. N-Benzyl-2,4-O-benzylidene-5-O-(iso-butyryl)-D-glucaro-1-amide-6,3-lactone in accordance with claim 1.

34. N-Benzyl-2,4-O-benzylidene-5-O-n-capryl-D-glucaro-1-amide-6,3-lactone in accordance with claim 1.

35. N-Benzyl-5-O-(p-chlorobenzoyl)-2,4-O-benzylidene-D-glucaro-1-amide-6,3-lactone in accordance with claim 1.

36. N-(p-Chlorobenzoyl)-5-O-acetyl-2,4-O-benzylidene-D-glucaro-1-amide-6,3-lactone in accordance with claim 1.

37. N-(p-Methoxyphenyl)-5-O-acetyl-2,4-O-benzylidene-D-glucaro-1-amide-6,3-lactone in accordance with claim 1.

38. N-(p-Ethoxyphenyl)-5-O-acetyl-2,4-O-benzylidene-D-glucaro-1-amide-6,3-lactone in accordance with claim 1.

39. N-(p-Chlorophenyl)-5-O-acetyl-2,4-O-benzylidene-D-glucaro-1-amide-6,3-lactone in accordance with claim 1.

40. N-(p-Chlorophenyl)-5-O-benzoyl-2,4-O-benzylidene-D-glucaro-1-amide-6,3-lactone in accordance with claim 1.

* * * * *

UNITED STATES PATENT OFFICE
CERTIFICATE OF CORRECTION

PATENT NO. : 3,915,993
DATED : October 28, 1975
INVENTOR(S) : Arata TANOURA et al PAGE 1 of 2

It is certified that error appears in the above-identified patent and that said Letters Patent are hereby corrected as shown below:

Column 2, line 66 and 67 and column 3, lines 1 and 4, that portion of the compound reading "-5O-", each occurrence, should read -- -5-0- --. Column 3, line 6, delete "51" and inserting therefor -- 5-0-isobutyryl-1)-glucaro-1 --.
    Column 3, lines 7-8, 12 and 27, column 15, line 28 and column 16, line 19, that part of the compound reading "-n-capryl-", each occurrence, should read -- -(n-capryl)- --. Column 3, line 30, that part of the compound reading "actyl" should read --acetyl--; line 31, that part of the compound reading "Methoxybenzylidene)" should read --methoxybenzylidene)--; line 41, that portion of the compound reading "-2,40-" should read -- -2,4-0- --.
Columns 7 and 8, table 5, columns 1 and 2 should read as follows:

| Compound | | | Dose |
|---|---|---|---|
| $R_1$ | $R_2$ | $R_3$ | (mg/kg) |
| | | | Control |
| -⟨H⟩ | -⟨⟩-$OH_3$ | -$CH_3$ | 500 |
| | | | 2000 |
| | | | Control |
| -⟨⟩ | -⟨⟩ | -$CH_3$ | 500 |
| | | | 2000 |

Column 8, lines 46, 56 and 60, and column 9, lines 8, 16 and 26, that part of the compound reading "-n-butyl-", each occurrence, should read -- -(n-butyl)- --. Column 9, line 29 should read -- 183° - 186°C. --. Column 13, line 52 "3 methoxypropyl," should read

UNITED STATES PATENT OFFICE
CERTIFICATE OF CORRECTION

PATENT NO. : 3,915,993
DATED : October 28, 1975
INVENTOR(S) : Arata TANOURA et al PAGE 2 of 2

It is certified that error appears in the above-identified patent and that said Letters Patent are hereby corrected as shown below:

-- 3-methoxypropyl, --; line 66, that part of the compound reading "-n-Butyl-" should read -- -(n-Butyl)- --. Column 15, line 26, that part of the compound reading "benzyliden)-" should read -- benzylidene)- --; line 38, that portion of the compound reading "-benzyl-" should read -- -benzoyl- --; line 39, that portion of the compound reading "glucaro-'-amide-" should read -- -glucaro-1-amide- --. Column 16, line 25, that part of the compound reading "N-(p-Chlorobenzoyl)-" should read -- N-(p-Chlorobenzyl)- --.

Signed and Sealed this

Second Day of November 1976

[SEAL]

Attest:

RUTH C. MASON
Attesting Officer

C. MARSHALL DANN
Commissioner of Patents and Trademarks